UNITED STATES PATENT OFFICE.

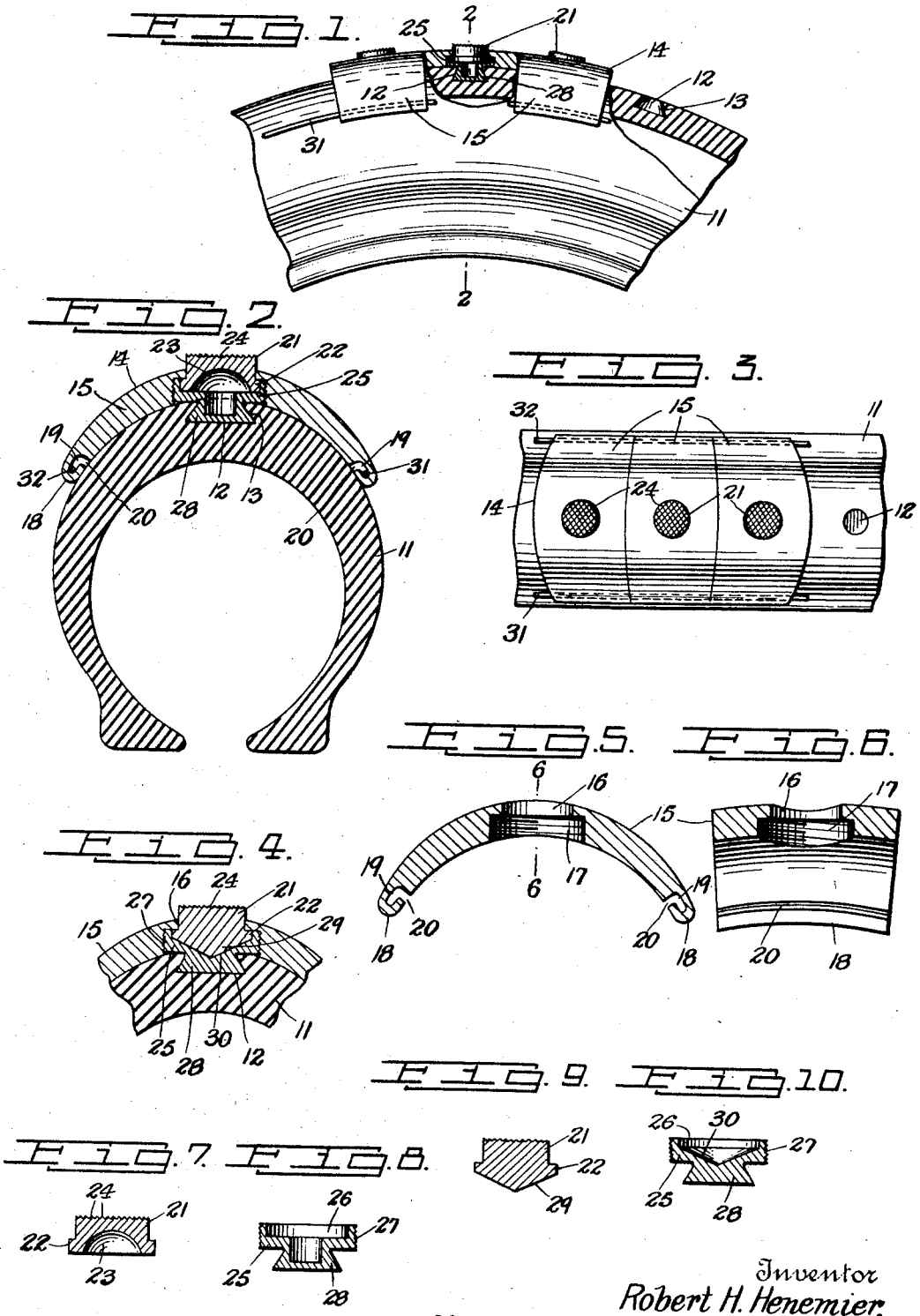

ROBERT H. HENEMIER, OF NEW YORK, N. Y.

TIRE-PROTECTOR.

1,369,026.  Specification of Letters Patent.  Patented Feb. 22, 1921.

Application filed May 26, 1920. Serial No. 384,271.

*To all whom it may concern:*

Be it known that I, ROBERT H. HENEMIER, a citizen of the United States, and residing at New York, in the county of New York and State of New York, have invented certain new and useful Improvements in Tire-Protectors, of which the following is a specification, such as will enable those skilled in the art to which it appertains to make and use the same.

This invention relates to protectors for pneumatic tires and also non-skid devices which form a part of said protectors, and the object of the invention is to provide a tire protector of the class specified which is composed of a plurality of sections adapted to be placed in juxtaposition circumferentially of a pneumatic tire and provided with improved means for holding the separate sections in position and in connection with the tire; a further object of the invention being to provide the separate sections of the protector with rotatable non-skid plugs which are detachably mounted in said sections; a still further object being to provide means for holding the separate sections of the protector in position upon the tread portion of a pneumatic tire; and with these and other objects in view the invention consists in a tire protector of the class specified which is simple in construction and operation and efficient in use, and which is constructed as hereinafter described and claimed.

The invention described and claimed herein is an improvement on that described and claimed in a prior patent granted to me February 10, 1920, No. 1,330,587, and is fully disclosed in the following specification, of which the accompanying drawing forms a part, in which the separate parts of my improvement are designated by suitable reference characters in each of the views, and in which:—

Figure 1 is a side view of a part of a pneumatic tire showing a part of my improved tire protector mounted thereon with part of the construction broken away and in section;

Fig. 2 a partial section on the line 2—2 of Fig. 1 and on an enlarged scale;

Fig. 3 a plan view of the construction shown in Fig. 1;

Fig. 4 a view similar to Fig. 2 but showing only a part of the construction and showing a modification;

Fig. 5 a detail sectional view of one of the plates or sections of my improved tire protector detached;

Fig. 6 a section on the line 6—6 of Fig. 5;

Fig. 7 a detail sectional view of one of a number of non-skid plugs which I employ in the construction shown in Figs. 1 and 2;

Fig. 8 a detail sectional view of one of a number of retaining members which I employ in the construction shown in Figs. 1 and 2; and, Figs. 9 and 10 are views similar to Figs. 7 and 8 respectively but showing the plug and retaining members employed in the construction shown in Fig. 4.

In Figs. 1 to 3 inclusive, I have shown at 11 a portion of a pneumatic tire or shoe which is of the usual or any preferred form of construction and is provided centrally of the tread portion thereof with a plurality of spaced apertures 12, the side walls of which are beveled as shown at 13. In practice, I provide an annular tire protector 14 which, in the form of construction shown, is composed of a plurality of separate plates or sections 15 which are arc-shaped in form in cross section.

The plates 15 are provided centrally thereof with apertures 16 having enlarged threaded apertures 17, and the side edge portions 18 of said plates are provided with longitudinal recesses 19 which open inwardly through the plates as shown at 20.

I also employ a plurality of non-skid plugs 21 which are adapted to be passed outwardly through the apertures 16 of the plates 15 and are provided with enlarged base portions 22, which limit the outward movement of said plugs, and the inner faces thereof are preferably provided with recesses 23 to lighten the same and to reduce the friction surface of said plugs, the outer faces of the plugs are preferably milled or otherwise fashioned as shown at 24 to produce a non-skid face on said plugs.

A plurality of retaining members 25 are also employed. The top portions of said members are recessed as shown at 26 and provided with external threads 27 to engage the threaded apertures 17 of the plates 15. Said members are provided centrally of the bottom faces thereof with projecting studs 28 which flare outwardly and are adapted to enter the apertures 12 on the periphery of the tire 11.

The plugs 21 and retaining members 25, as above described, are shown in Figs. 1 and 2 and in detail in Figs. 7 and 8, but in Figs. 4, 9 and 10 I have shown a slight modification in the form of said plugs and retaining members in which the base of the plugs 21 are made conical in form as shown at 29 and the retaining members 25 are provided with conically formed recesses 30 adapted to receive the conical bases 29 of the plugs 21. The construction shown in Figs. 4, 9 and 10 will permit of the free rotation of the plugs 21 in the retaining members 25 with but little friction.

In assembling the various parts of my improved tire protector, the separate plates or sections 15 are placed upon the periphery of the tire when in a deflated condition, it being understood that the plugs 21 and retaining members 25 are connected with said plates in the manner shown and in the placement of said plates and said tire the studs 28 of the retaining members 25 are placed in the apertures 12 and two annular cables or ring members 31 and 32 are placed in the recesses 19 of the separate plates 15. After all of the plates 15 have been placed in position, as above set out, the tire is inflated thus extending or moving the plates 15 outwardly to such an extent as to put a tension on the cables or ring members 31 and 32. The cables or ring members 31 and 32 in connection with the studs 28 will serve to hold the plates 15 firmly in position upon the tread portion of the tire and yet permit of a slight movement of said plates one upon another and with the tire when the same is in use; the non-skid plugs 21 which project beyond the face of the plates 15 taking up the wear and presenting a very desirable non-skid element for the tire by reason of the rotatable action of said plugs in the separate plates.

It will be apparent that while I have shown certain details of construction for carrying my invention into effect, I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. An annular protector for pneumatic tires comprising a plurality of transversely arranged plates, non-skid bearing plugs rotatably mounted in said plates, means on said plates and said plugs for limiting the outward movement of said plugs, retaining members secured to said plates and adapted to hold said plugs in position against inward movement, and means on said retaining members adapted to be embedded in the tread portion of a pneumatic tire for holding said plates against displacement on said tire.

2. The combination with a pneumatic tire, the tread portion of which is provided with a plurality of spaced apertures of an annular protector comprising a plurality of transversely arranged arc-shaped plates, means detachably mounted on the inner faces of said plates and adapted to engage the apertures in said tire for holding said plates against displacement thereon, and non-skid plugs detachably and rotatably mounted in said plates and projecting beyond the outer faces thereof.

3. The herein described protector for pneumatic tires, said protector comprising a plurality of transversely arranged arc-shaped plates having apertures, non-skid plugs detachably and rotatably mounted in said apertures and projecting beyond the outer faces of said plates, means on said plates and said plugs for limiting the outward movement of said plugs, and retaining members detachably mounted in said apertures and adapted to hold said plugs against inward movement through said plates.

4. An annular protector for pneumatic tires comprising a plurality of transversely arranged plates having central apertures which extend therethrough and the outer portions of which are reduced to form annular flanges, non-skid bearing plugs passed outwardly through the apertures in said plates and provided with annular rims which engage the flanged portions of said apertures to limit the outward movement of said plugs in said plates, and retaining members detachably mounted in the apertures of said plates and which serve to limit the inward movement of said plugs in said plates and permit said plugs to rotate therein.

5. An annular protector for pneumatic tires comprising a plurality of transversely arranged plates having central apertures which extend therethrough and the outer portions of which are reduced to form annular flanges, non-skid bearing plugs passed outwardly through the apertures in said plates and provided with annular rims which engage the flanged portions of said apertures to limit the outward movement of said plugs in said plates, retaining members detachably mounted in the apertures of said plates and which serve to limit the inward movement of said plugs in said plates and permit said plugs to rotate therein, and said retaining members being provided with inwardly projecting tapered portions adapted to be countersunk in the tread portion of a pneumatic tire for holding the separate plates against displacement thereon.

In testimony that I claim the foregoing as my invention I have signed my name in presence of the subscribing witnesses this 25th day of May 1920.

ROBERT H. HENEMIER.

Witnesses:
C. E. MULREANY,
H. E. THOMPSON.